April 28, 1959  S. SOLOW  2,884,562
BRIGHTNESS CONTROL CIRCUIT
Filed Aug. 14, 1957  2 Sheets-Sheet 1

INVENTOR.
SAMUEL SOLOW
BY Darby + Darby
ATTORNEYS

INVENTOR.
SAMUEL SOLOW

United States Patent Office 2,884,562
Patented Apr. 28, 1959

2,884,562

BRIGHTNESS CONTROL CIRCUIT

Samuel Solow, Tucson, Ariz., assignor to Allen B. Du Mont Laboratories, Inc., Clifton, N.J., a corporation of Delaware Application August 14, 1957, Serial No. 678,217

7 Claims. (Cl. 315—22)

This invention relates to brightness control circuits, and more particularly to that portion of the circuitry of a cathode ray oscilloscope which is directed to controlling the brightness of the pattern on the cathode ray tube faceplate.

Brightness control is an extremely desirable feature, since different settings are required for transient and repetitive patterns, fast and slow sweep speeds, and various instances where it is dessired to photograph the pattern.

As is well known, an oscilloscope is an instrument for producing a visible line, known as a "trace," whose waveform is representative of electrical signals applied to the instrument. It is therefore essential that the entire trace be visible, since any deleted portion may contain information that it is desired to study. Unfortunately prior art circuitry for controlling the brightness of the trace inherently deleted the initial portion thereof, a phenomenon known as "loss of base line," the effect of which was particularly pronounced when displaying a pulse or sharply rising waveform at high sweep speeds.

It is therefore the principal object of my invention to provide an improved brightness control circuit for oscilloscopes.

It is another object of my invention to provide a trace brightening circuit wherein the trace always begins at the same point, regardless of ultimate brightness or sweep speed.

It is still another object of my invention to provide a trace brightening circuit wherein the trace brightness remains substantially constant for its entire duration.

Figures 1A, 1B, 1C:
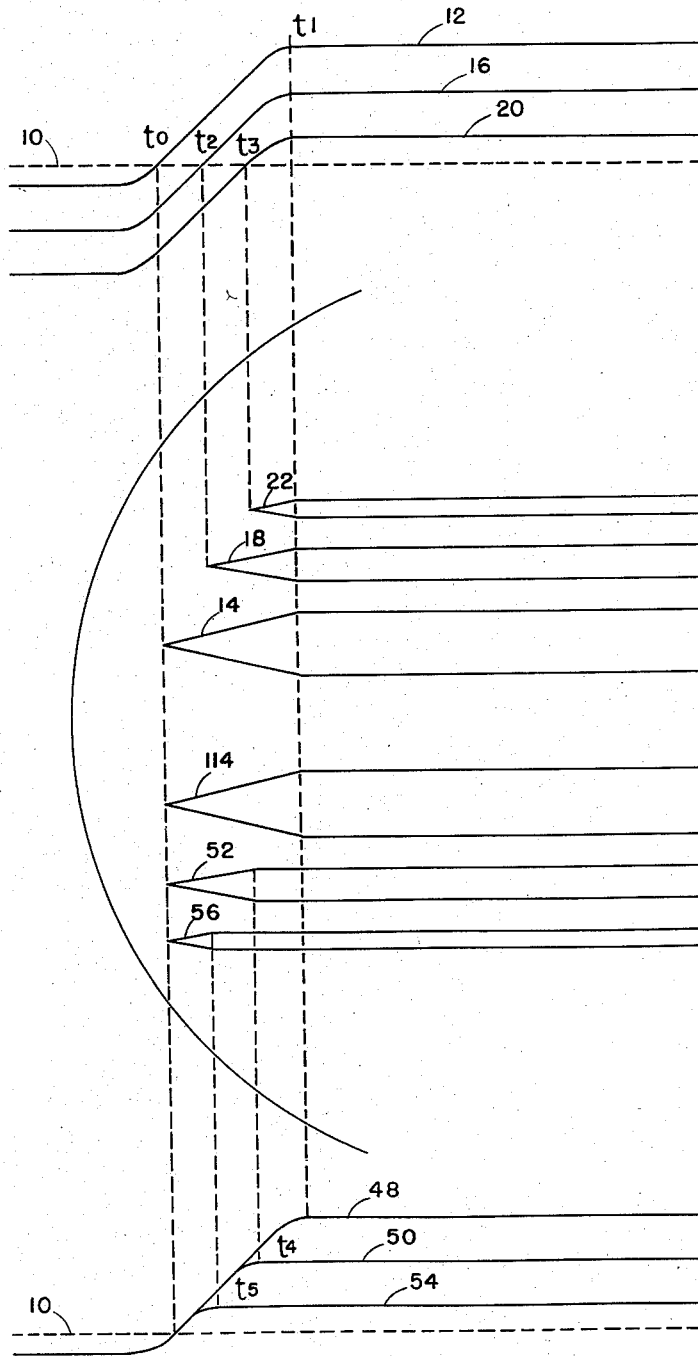
Figure 2:
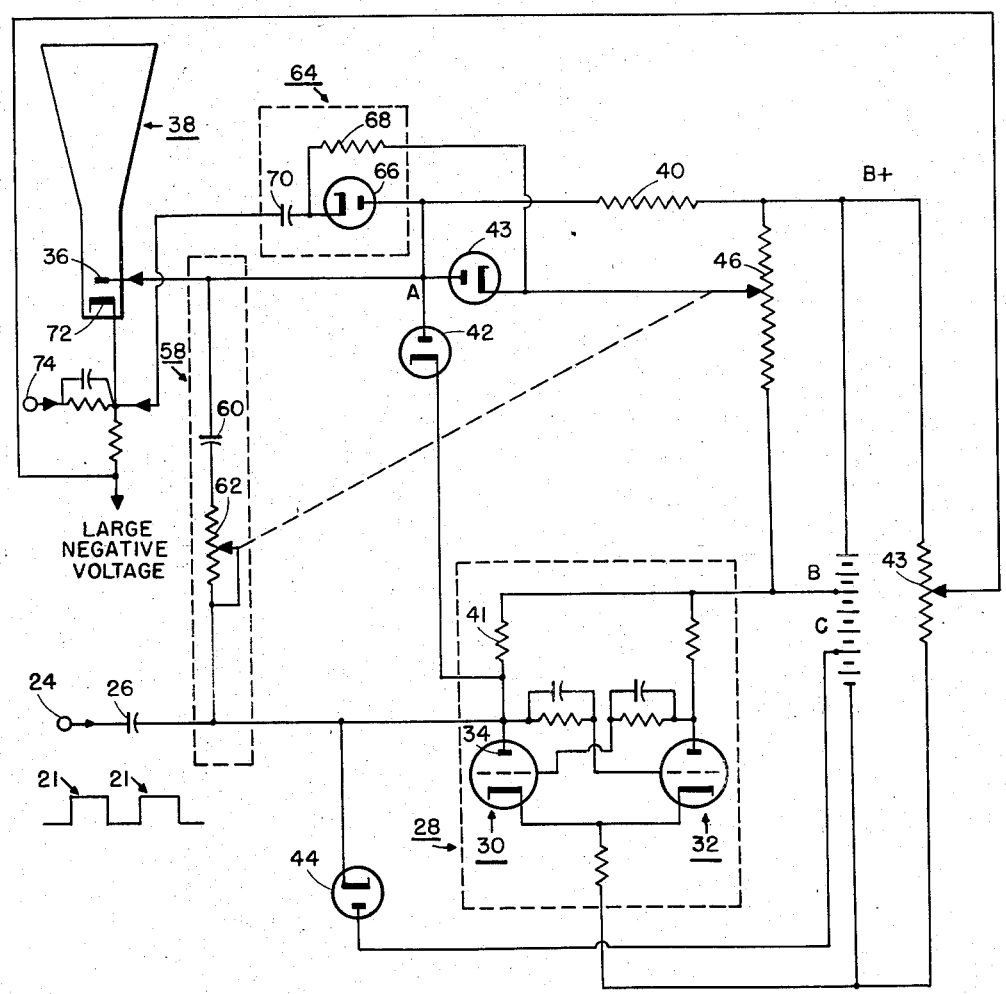

The attainment of these objects and others will be realized from the following specification, taken in conjunction with the drawings, in which, Figs. 1A, 1B, and 1C compare the brightening waveforms and results produced by prior art circuits and by my invention; and Fig. 2 illustrates a basic circuit of my invention, which achieves the improved results shown in Fig. 1.

The basic concept of my invention is to adjustably control the upper limit of the brightening pulse, leaving the lower limit stationary rather than varying the level of the entire pulse as was done previously.

In order to facilitate the following explanation, the following terms will be used. "Upvolting" signifies that the voltage at a particular point is raised, there being no implication that the actual potential is positive or negative, or has experienced a change in sign. Similarly, "downvolting" signifies that the voltage has been lowered.

Brightness, and control thereof, is achieved as follows. The visible trace itself is produced when electrons strike a light emitting fluorescent layer on the inner surface of the tube's faceplate. Since the number of impinging electrons determines the trace brightness, a brightening pulse, usually positive going, is applied to the cathode ray tube grid to control the electron beam intensity. The height of this pulse determines the ultimate trace brightness. Since in actuality the leading and trailing edges of every pulse are slanting rather than truly perpendicular, the brightness of the trace changes gradually from zero to the desired intensity though this gradation may occur in an extremely short time. This gradation is most noticeable, as well as most objectionable, at high sweep speeds.

One further bit of background, the meaning of the terms "trace" interval and "retrace" interval will prove helpful in the understanding of the following discussion. As the beam of electrons produced by the cathode ray tube sweeps from the viewer's left to his right, the impingement of the electrons on the tube's fluorescent screen produces a moving spot of light which traces out a visible line, this interval being known as the "trace" or "writing" interval. In order for the spot to produce another line, it must return to the left side of the faceplate, thus producing the "retrace" interval, and requirements dictate that the light should be extinguished, or blanked out, during this retrace interval. The application of the brightening waveform to a grid of the cathode ray tube determines when a spot of light is produced.

Since it is desirable to see the trace, but not the retrace, a brightening pulse is applied to the cathode ray tube only during the trace interval, the absence of said pulse therefore blanking or eliminating from view the undesirable retrace.

Fig. 1 shows this time brightness relationship and associated brightness waveforms, Fig. 1A and part of Fig. 1B being directed to the prior art. Attention is directed to Fig. 1A which shows a cutoff level 10 for the cathode ray tube. When the instantaneous amplitude of the brightening pulse is less than the value established by cutoff level 10, no electrons strike the fluorescent layer and there is no visible trace. Fig. 1A also shows a brightening pulse 12. It will be seen that at a particular time ($t_0$) its value begins to exceed cutoff, and that at some time later ($t_1$) its value stabilizes at a maximum.

Attention is now directed to Fig. 1B, the outer circle of which represents the periphery of a cathode ray tube faceplate. Geometric figure 14 represents the brightness of the trace produced by waveform 12. It will be seen that the brightness appears at time $t_0$ and continues to increase until time $t_1$ at which time the brightness reaches a maximum and remains at that value, as indicated by the subsequent constant width of geometric figure 14.

The action of prior art brightness control circuitry inherently associated lower brightness with loss of base line in the following manner. In Fig. 1A reference character 16 represents the waveform which is used to obtain medium brightness of the trace. It will be noted that waveform 16 is obtained by dropping the entire waveform 12 to a lower level. Since waveform 16 exceeds cutoff level 10 at time $t_2$, the visible trace, as indicated in Fig. 1B by reference character 18, starts at time $t_2$. Waveform 16 reaches its maximum at time $t_1$, and remains substantially constant from then on, the brightness being shown by the width of geometrical figure 18. As shown, its final width is less than that of geometrical figure 14, thus indicating a lower brightness.

Referring back once more to Fig. 1A, another waveform 20, which is original brightening pulse 12 dropped to a still lower level, is utilized to achieve low trace brightness. It may be seen that this waveform exceeds the cutoff level at time $t_3$. In Fig. 1B geometric figure 22 indicates the starting point and maximum intensity of the low brightness trace. Comparison of geometric figures 14, 18, and 22 indicates that while the desired brightness control is achieved, the visible trace begins at different points. The moving of the starting point, or loss of base line, is extremely objectionable since any phenomenon which occurs during this interval would not be displayed on the cathode ray tube.

As previously explained, the brightness control waveforms preferably have precipitous edges and suitable amplitude, repetition rates, and duration. If an attempt is made to use signals obtained as by-products from previous amplifiers, and/or connecting networks, it will be found that their shapes and amplitudes are generally unsuitable. In addition, the cathode of the cathode ray tube is usually connected to an extremely large negative voltage, often as much as 6000 volts, and a blocking capacitor is required. This capacitor tends to further distort the by-product signals.

One simple method of producing the desired brightening waveform is to have the incoming by-product signals act as a trigger to energize an Eccles-Jordan type of multivibrator which has two stable states, and is flipped from one to the other by the triggering signals. Well known design principles permit the multivibrator to produce brightening waveforms having the desired duration, repetition rate, amplitude, and other characteristics.

With the foregoing background and limitations of prior circuitry in mind, attention is now directed to Fig. 2 which illustrates the circuitry of my invention. As previously indicated, my invention acts to control the upper level of the brightening waveform while maintaining the lower level fixed, rather than raising or lowering the entire waveform bodily as was done in prior art circuits.

The operation of my invention may be understood from Fig. 2. A triggering signal 21, shown as a pulse, is applied to terminal 24, traverses blocking capacitor 26, and reaches multivibrator 28. The multivibrator comprises two tubes 30 and 32, anode 34 producing the actual brightening waveform which is applied to control grid 36 of cathode ray tube 38.

Blankout during the retrace interval is produced as follows. The negative going edge of the triggering pulse 21 applied to multivibrator 28 causes the circuit to assume its stable state in which tube 30 is conductive. Current for this tube flows from B+ through resistance 40 and diode 42 to anode 34. (Anode 34 is energized from B+, a voltage which is somewhat higher than is actually necessary for tube operation, because sufficient voltage is desired to produce a high amplitude brightening waveform). The current flow through resistance 40 downvolts point A in the well known manner, and, since diode 42 is conductive, the downvolting is simultaneously transmitted to anode 34 and to grid 36 of the cathode ray tube, thus cutting off the electron beam of cathode ray tube 38, and extinguishing the brightness for the retrace interval. A clamping diode 44 assures that the same lower level of the brightening waveform is reestablished each time.

The electron beam is turned on for the writing interval when the positive going edge of the next triggering pulse 21 applied to terminal 24 reaches the grid of tube 32, the action of multivibrator 28 being such that tube 32 becomes conductive while tube 30 is cut off. Under this condition, tube 30 draws no current through resistance 40, and anode 34 is upvolted toward B+. Ordinarily, this upvolting action would continue until the potential at point A and of the brightness waveform equalled B+.

In accordance with my invention, however, the upvolting action is terminated at a point determined by the operator. It will be seen that diode 43 has its cathode potential determined by potentiometer 46. As has been shown, at the beginning of the trace interval tube 30 is cut off and draws no current through resistance 40, which thus upvolts point A. As soon as the potential at point A exceeds that established by potentiometer 46, diode 43 becomes conductive, thus clamping point A, and preventing the potential there from rising further. Since grid 36 of the cathode ray tube is connected directly to point A, its upper potential is thus predetermined by the setting of potentiometer 46.

Depending upon the potential established by potentiometer 46 relative to that at point B, diode 42 may assume one of two conditions. The first is that it may become nonconducting when the arm of 46 is at B, since there is not enough potential across it for it to remain conductive; in this case anode 34 assumes the potential at point B. The second possibility is that diode 42 remains conductive by drawing current through resistance 41; in this case anode 34 is substantially at the same potential as point A. In either case, conductive tube 32 is operating from the potential established at point B, while non-conductive tube 30 has its anode connected to a potential equal to or somewhat higher than that at point B. Thus, both tubes of multivibrator 28 are connected to suitable potentials which assure their satisfactory operation. In this way, the upper level of the brightening waveform, and thus the trace brightness, is determined by the setting of brightness control potentiometer 46, while the multivibrator is energized by the correct voltage to flip it into its other state.

The brightening action of my invention is clearly shown in Figs. 1B and 1C. Geometrical pattern 114 illustrates the brightening effect produced by brightening waveform 48. This waveform produces maximum brightness, and is obtained from anode 34 with potentiometer 46 at its most positive setting. The close correspondence between waveforms 12 and 48, and patterns 14 and 114 will of course be noted, since they are technically similar.

However, as the brightness is reduced, the advantages of my invention are immediately apparent. Medium trace brightness is obtained when brightness control potentiometer 46 of Fig. 2 is at an intermediate setting, and thus produces brightness waveform 50 of Fig. 1C. It will be seen that the trace produced by waveform 50 starts at the same time, $t_0$, but reaches its maximum brightness at time $t_4$. The resultant brightness variation is shown in Fig. 1B by geometrical figure 52. Similarly, a lower setting of potentiometer 46 will produce waveform 54 (shown in Fig. 1C) and resultant trace brightness 56 (shown in Fig. 1B). Geometrical pattern 56 shows that the low brightness trace also starts at time $t_0$, but reaches its maximum value at time $t_5$.

The advantages of my invention are most clearly seen in Fig. 1B by comparing the prior art brightness diagrams 14, 18, and 22 with brightness diagrams 114, 52, and 56, as produced by my invention. The prior art patterns show the resultant loss of base line with changes in brightness, while the patterns for my invention show that no loss occurs. Of course it will be realized that similar advantages apply at the terminating end of the trace.

With the circuitry as described to this point, a sharply rising pulse 21 would not have its leading edge properly reproduced at the cathode ray tube grid 36 since the current surge required to charge the stray capacitance and inherent capacitance of the grid of the cathode ray tube 36 would have to traverse paths 24, 26, 42, A, and 36, and diode 42 would cut off during the fast rise and later cut back on when the slow multivibrator 28 became operative.

My invention includes a circuit for compensating for loss of sharply rising pulse 21. The elements thereof are enclosed in dotted rectangle 58 of Fig. 2, and comprise a capacitance 60 and a variable resistance 62.

A portion of the positive going triggering signal 21 applied to terminal 24 is differentiated by elements 60 and 62, and the result applied directly to grid 36 of the cathode ray tube. These differentiating elements tend to produce a current surge, which compensates for the falling off in the leading edge of the brightening pulse due to the effect of stray and inherent capacitances. Since the compensation should be maximum for high brightness and minimum for low brightness, I interconnect variable resistance 62 with brightness control potentiometer 46, so that the proper amount of compensation is automatically provided for various settings of the brightness control potentiometer 46.

A second order effect, a momentary extra high brightness known as "overshoot," introduces itself when turning on the beam of a cathode ray tube. This is caused by the surge of current due to the leading edge of signal 21. In order to overcome this shortcoming, I introduce the elements in rectangle 64, comprising a diode 66 which has its anode connected to point A, and a resistance 68 connecting the cathode of diode 66 to the cathode of diode 43. It will be seen that diodes 66 and 43 both have their anodes connected to point A, and have their cathodes connected by resistance 68. As previously explained, the overshoot voltage, which is any voltage higher than the cathode voltage of diode 43 as set by brightness control potentiometer 46, is applied to the control grid 36, and the identical voltage is applied through diode 66 and capacitance 70 to the cathode 72 of the cathode ray tube. In this way, the overshoot is applied to both grid 36 and cathode 72 of the cathode ray tube, and therefore the voltage difference between these two electrodes remains the same, thus eliminating overshoot. As the overshoot voltage disappears, the higher voltage which was applied to the anode of diode 66 also disappears, and diode 66 becomes nonconductive and drops out of the circuit. It may thus be seen that during overshoot the grid and cathode of the cathode ray tubes are simultaneously upvolted, while after the overshoot interval has passed the brightening signal is applied only to the grid. In this way, the effect of overshoot is removed.

As previously explained, the lower limit of the brightening pulse in established by a clamping diode 44 connected in such a way that if the brightening pulse tends to drop to a potential value lower than that at point C, diode 44 becomes conductive and prevents it. It is, of course, desirable that this lower limit be below the cutoff level 10 of the cathode ray tube, as shown in Fig. 1. Since the potential at point C is, to a limited extent, determined by potential levels necessary for the multivibrator and associated circuitry, it is desirable to establish cutoff conditions in another way.

Cutoff adjustment may be provided by a potentiometer 43, whose slider is connected to the cathode of the cathode ray tube. As shown, this arrangement establishes at cathode 72 of cathode ray tube 38, a potential level which is high enough so that when the grid is downvolted to the potential at point C, the tube is cut off. While this is called an adjustment, its primary purpose is to adapt the circuit to cathode ray tubes having different cutoff characteristics.

"Z" input signals may of course be applied to tube 38 in any well known manner, the circuit illustrating a "Z" input terminal 74 which applies these signals to cathode 72.

My invention thus provides an adjustable brightness without any loss of the base line. In addition, I provide circuitry which produces more precipitous edges for the brightening waveform. Additional circuitry is shown to eliminate overshoot, and to establish cutoff levels for the cathode ray tube.

Having disclosed the principles and one embodiment of my invention, I desire to be limited not by the foregoing illustrations and examples, but rather by the appended claims.

I claim:

1. For use with a cathode ray tube, the combination comprising: means for producing a pulse type brightening waveform; means whereby the brightness may be adjustably controlled without loss of base line, said means comprising means for providing brightening waveform with a fixed lower limit and an upper limit which is adjustable with respect to said lower limit; and means to apply said brightening waveform to said cathode ray tube.

2. A circuit for providing a brightening waveform having a fixed lower limit and an adjustable upper limit for application to a grid of a cathode ray tube, said circuit comprising: means for producing a pulse type brightening waveform; means to control the upper limit of said waveform, said means comprising an adjustable source of potential and means to clamp said brightening waveform at a value established by said adjustable source, whereby said waveform is prevented from increasing its potential and its upper limit is thereby established; and means to apply said brightening waveform to said grid of said cathode ray tube.

3. A circuit for producing a brightening waveform having a fixed lower limit and an adjustable upper limit for application to a grid of a cathode ray tube, said circuit comprising: means, energized by an input signal, for producing a brightening waveform; means to adjustably control the upper limit of said waveform with respect to said lower limit, said means comprising an adjustable source of potential and a clamp tube; means causing said clamp tube to clamp said brightening waveform at a value established by said upper limit controlling means, whereby said waveform is prevented from increasing its potential and its upper limit is thereby established; means to apply said brightening waveform to said grid of said cathode ray tube; means to increase the steepness of said brightening waveform, said means comprising a differentiating circuit energized by said input signal; and means to apply the output of said differentiating circuit to said grid whereby the surge produced by said differentiating circuit is added to the leading edge of said brightening waveform.

4. The circuit of claim 3 wherein said differentiating network comprises a variable resistance ganged to said source of variable potential, whereby said steepness increasing signal varies in accordance with said upper limit of said brightening waveform.

5. The circuit of claim 4 including means to eliminate overshoot, said means comprising a network, connected between said cathode of said cathode ray tube and said grid of said cathode ray tube, to transmit to said cathode, overshoot voltage present at said grid.

6. A circuit for producing a brightening waveform having a fixed lower limit and an adjustable upper limit for application to a grid of a cathode ray tube, said circuit comprising: a multivibrator energized by an input signal whereby said multivibrator produces a brightening waveform; means to control the upper limit of said waveform, said means comprising an adjustable source of potential and a clamp tube; means causing said clamp tube to clamp said brightening waveform at a value established by said upper limit controlling means, whereby said waveform is prevented from increasing its potential and its upper limit is thereby established; means to apply said brightening waveform to said grid of said cathode ray tube; means to increase the steepness of said brightening waveform, said means comprising a differentiating network energized by said input signal, said differentiating network comprising a variable resistance ganged to said source of variable potential, whereby said steepness increasing signal varies in accordance with said upper limit of said brightening waveform; and means to apply the output of said differentiating network to said grid, whereby the surge produced by said differentiating circuit is added to the leading edge of said brightening waveform.

7. The circuit of claim 6 including means to eliminate overshoot, said means comprising a diode and a capacitance connected between said cathode of said cathode ray tube and said grid of said cathode ray tube, whereby overshoot voltage produced at said grid is transmitted to said cathode.

(References on following page)

References Cited in the file of this patent

UNITED STATES PATENTS

| | | |
|---|---|---|
| 2,375,709 | Thompson | May 8, 1945 |
| 2,438,420 | Scoles | Mar. 23, 1948 |
| 2,465,364 | Ferrar | Mar. 29, 1949 |
| 2,540,646 | Bernard | Feb. 6, 1951 |
| 2,651,739 | Chudleigh | Sept. 8, 1953 |
| 2,695,953 | Seabury | Nov. 30, 1954 |
| 2,752,525 | Montague | June 26, 1956 |
| 2,760,108 | Wilson | Aug. 21, 1956 |
| 2,801,364 | Janssen | July 30, 1957 |